United States Patent Office

2,855,423
Patented Oct. 7, 1958

2,855,423

O-ARYL O-LOWER ALKYL PHOSPHOROHYDRAZI-DOTHIOATES

Etcyl H. Blair, Midland, Mich., assignor to The Dow Chemical Company, Midland, Mich., a corporation of Delaware No Drawing. Application April 30, 1956
Serial No. 581,268

6 Claims. (Cl. 260—461)

This invention is concerned with the phosphorohydrazidothioates having the formula $$R-O-\overset{\overset{\displaystyle S}{\|}}{P}\overset{O-X}{\underset{NH-N\underset{Z}{\diagdown}}{\diagup}}H$$

In this and succeeding formulas, R represents an aryl radical whose monovalent phenyl nucleus may contain at least one substituent selected from the group consisting of chlorine, bromine, nitro and alkoxy, X represents lower alkyl and Z represents hydrogen or phenyl. The substituent R as used in the above formula refers to an unsubstituted phenyl radical or to a phenyl radical substituted with one or more chlorine, bromine, lower alkyl, cyclohexyl, phenyl, benzyl, lower alkoxy or nitro substituents. The terms "lower alkyl" and "lower alkoxy" refer to the alkyl and alkoxy radicals containing from one to two carbon atoms, inclusive. These new compounds are crystalline solids or viscous liquids, somewhat soluble in many organic solvents and of very low solubility in water. They have been found to be active as parasiticides and are adapted to be employed as active toxic constituents of compositions for the control of bacterial, fungi, mites and insect organisms such as houseflies and the Mexican bean beetle. The compounds are also useful as herbicides for the control of undesirable vegetation such as canary grass.

The new compounds may be prepared by reacting hydrazine hydrate or phenylhydrazine with a phosphorochloridothioate of the formula $$R-O-\overset{\overset{\displaystyle S}{\|}}{P}\overset{O-X}{\underset{Cl}{\diagdown}}$$

The reaction is carried out in the presence of an inert organic solvent such as benzene, toluene, methylene chloride or carbon tetrachloride. The reaction is somewhat exothermic and takes place smoothly at the temperature range of from 0° to 50° C. with the formation of the desired product and hydrazine or phenylhydrazine hydrochloride. The temperature may be controlled by regulating the rate of contacting the reactants and by external cooling. Good results are obtained when employing at least two molecular proportions of hydrazine hydrate or phenylhydrazine reagent with each molecular proportion of the phosphorochloridothioate reagent.

In carrying out the reaction, the hydrazine hydrate or phenylhydrazine reagent is added portionwise to the phosphorochloridothioate reagent dispersed in the reaction solvent. In an alternative procedure, the phosphorochloridothioate reagent dispersed in the reaction solvent may be added portionwise to the hydrazine hydrate or phenyl hydrazine reagent dispersed in the reaction solvent. In either case, the operation is carried out with stirring and at a temperature of from 0° to 50° C. Upon completion of the reaction, the reaction mixture may be washed with water and any reaction solvent removed by evaporation or partial distillation under reduced pressure to obtain the desired product as a residue.

The following examples illustrate the invention but are not to be construed as limiting the same.

EXAMPLE 1

*O-(2,4,5-trichlorophenyl) O-methyl phosphorohydrazidothioate*

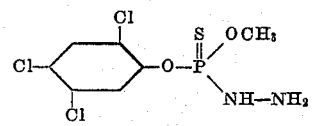

O-(2,4,5-trichlorophenyl) O-methyl phosphorochloridothioate (0.1 mole, 32.6 grams) dissolved in 100 milliliters of benzene was added portionwise with stirring to a slurry of 0.3 mole (15.1 grams) of 100 percent hydrazine hydrate in 50 milliliters of benzene. The addition was carried out in 25 minutes and at a temperature of from 20° to 25° C. Following the addition, the reaction mixture was stirred for 30 minutes to complete the reaction. The reaction mixture was then washed with water and the benzene removed by distillation under reduced pressure. There was thus obtained an O-(2,4,5-trichlorophenyl) O-methyl phosphorohydrazidothioate product as a glassy residue. This product was repeatedly recrystallized from isopropyl alcohol and found to melt at 88°–88.5° C.

EXAMPLE 2

*O-(2,4,5-trichlorophenyl) O-methyl-2-phenyl phosphorohydrazidothioate*

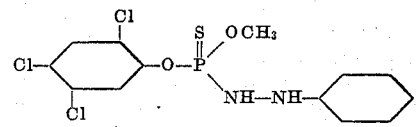

A solution of 32.6 grams (0.1 mole) of O-(2,4,5-trichlorophenyl) O-methyl phosphorochloridothioate dissolved in 100 milliliters of methylene chloride was added portionwise with stirring to a solution of 21.6 grams (0.2 mole) of phenyl hydrazine in 200 milliliters of methylene chloride. The addition was carried out in 30 minutes and at a temperature of 10° C. After the addition, stirring was continued for one hour at room temperature. The reaction mixture was then heated at 40°–43° C. and under reflux for 10 minutes to complete the reaction. The phenyl hydrazine hydrochloride formed was removed by filtration and the solvent removed from the filtrate by distillation under reduced pressure. As a result of these operations, there was obtained an O-(2,4,5-trichlorophenyl) O-methyl-2-phenyl phosphorohydrazidothioate product as a solid residue. This product was thrice recrystallized from isopropyl alcohol to obtain a purified product, melting at 134°–135° C.

EXAMPLE 3

*O-(2,5-dimethylphenyl) O-methyl phosphorohydrazidothioate*

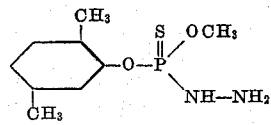

A solution of 25 grams (0.1 mole) of O-(2,5-dimethylphenyl) O-methyl phosphorochloridothioate in 50 milliliters of benzene was added portionwise with stirring to a slurry of 15 grams (0.3 mole) of 100 percent hydrazine hydrate in 50 milliliters of benzene. The addition was carried out in 30 minutes and at a temperature of from 10° to 17° C. After the addition, the mixture was stirred for two hours at room temperature to complete the reaction. Upon completion of the reaction, the reaction mixture was washed with water and the benzene evaporated. There was obtained an O-(2,5-dimethylphenyl) O-methyl phosphorohydrazidothioate product as a liquid residue having a density of 1.2447 at 25° C. and a refractive index of 1.5698 at 25° C.

EXAMPLE 4

O-(chloro-2-cyclohexylphenyl) O-methyl phosphorohydrazidothioate

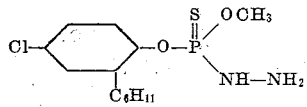

Hydrazine hydrate (4 grams) was added portionwise with stirring to 7 grams (.025 mole) of O-(4-chloro-2-cyclohexylphenyl) O-methyl phosphorochloridothioate dissolved in 30 milliliters of benzene. The addition was carried out in five minutes and at a temperature of 30° C. Following the addition, the mixture was stirred for 30 minutes at 30° C. to complete the reaction. The reaction mixture was then washed with water and the benzene removed by evaporation to obtain an O-(4-chloro-2-cyclohexylphenyl) O-methyl phosphorohydrazidothioate product as a solid residue. This product was recrystallized from methyl cyclohexane and found to melt at 85°–87° C.

EXAMPLE 5

O-(4-nitrophenyl) O-methyl phosphorohydrazidothioate

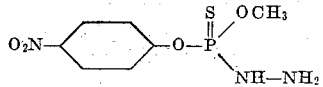

Hydrazine hydrate (12.5 grams, 0.25 mole) was added portionwise with stirring to 26.7 grams (0.1 mole) of O-(4-nitrophenyl) O-methyl phosphorochloridothioate dissolved in 100 milliliters of benzene. The addition was carried out in ten minutes and at a temperature of from 10° to 13° C. Following the addition, the reaction mixture was stirred until a solid mass formed. An additional 200 milliliters of benzene and 100 milliliters of water was added and the solid removed by filtration to obtain an O-(4-nitrophenyl) O-methyl phosphorohydrazidothioate product. This product was recrystallized from methanol and found to melt at 103° C.

EXAMPLE 6

O-(2-biphenylyl) O-methyl phosphorohydrazidothioate

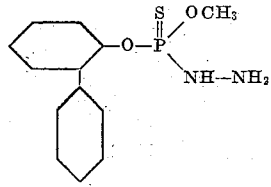

Hydrazine hydrate (5 grams, 0.1 mole) was added portionwise with stirring to 11 grams (0.037 mole) of O-(2-biphenylyl) O-methyl phosphorochloridothioate dissolved in 50 milliliters of benzene. The addition was carried out in ten minutes and at a temperature of from 25° to 35° C. After the addition, the reaction mixture was stirred for 30 minutes to complete the reaction. Upon completion of the reaction, water was added to dissolve the hydrazine hydrochloride formed. After stirring for an additional hour, the O-(2-biphenylyl) O-methyl phosphorohydrazidothioate product was crystallized as a white solid and was separated by filtration. This product was recrystallized from methanol and found to melt at 76°–77° C.

EXAMPLE 7

O-(4-methoxyphenyl) O-methyl phosphorohydrazidothioate

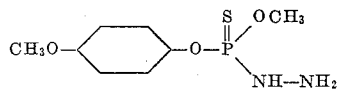

Hydrazine hydrate (7 grams, 0.14 mole) was added portionwise with stirring to 15 grams (0.05 mole) of O-(4-methoxyphenyl) O-methyl phosphorochloridothioate dissolved in 35 milliliters of benzene. The addition was carried out in ten minutes and at a temperature of from 20° to 30° C. Following the addition, the reaction mixture was stirred at room temperature for one hour to complete the reaction. Upon completion of the reaction, the reaction mixture was washed with water, the benzene solution filtered and the solvent removed therefrom by distillation under reduced pressure. There was thus obtained as a liquid residue an O-(4-methoxyphenyl) O-methyl phosphorohydrazidothioate product having a density of 1.302 at 25° C. and a refractive index $n/D$ of 1.5761 at 25° C.

EXAMPLE 8

O-(2-bromo-4-tertiarybutylphenyl) O-methyl phosphorohydrazidothioate

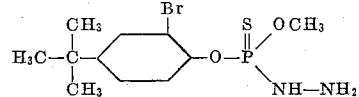

Hydrazine hydrate (11 grams, 0.22 mole) was added portionwise with stirring to 0.1 mole of O-(2-bromo-4-tertiarybutylphenyl) O-methyl phosphorochloridothioate dissolved in 130 milliliters of methylene chloride. The addition was carried out in 30 minutes and at a temperature of 20° C. After the addition, the mixture was heated at 40° C. for 30 minutes and then stirred at room temperature for two hours to complete the reaction. The reaction mixture was then washed with water and the methylene chloride evaporated to obtain an O-(2-bromo-4-tertiarybutylphenyl) O-methyl phosphorohydrazidothioate product as a solid residue. The product was recrystallized from methanol and found to melt at 92.5°–93.5° C.

EXAMPLE 9

O-(2,4,5-trichlorophenyl) O-ethyl phosphorohydrazidothioate

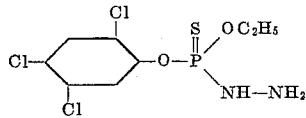

Hydrazine hydrate (12.5 grams, 0.25 mole) was added portionwise with stirring to 34 grams (0.1 mole) of O-(2,4,5-trichlorophenyl) O-ethyl phosphorochloridothioate dissolved in 225 milliliters of methylene chloride. The addition was carried out in 20 minutes and at a temperature of 15° C. After the addition, the mixture was heated at 40° C. for 15 minutes to complete the reaction. The reaction mixture was then washed with water and the methylene chloride evaporated to obtain an O-(2,4,5-trichlorophenyl) O-ethyl phosphorohydrazidothioate product as a solid residue. This product was recrystallized from petroleum ether and found to melt at 56°–58° C.

In a similar manner other O-aryl O-lower alkyl phosphorohydrazidothioates may be prepared of which the following are representative:

O-(3,4-dichlorophenyl) O-ethyl phosphorohydrazidothioate by the reaction of hydrazine hydrate and O-(3,4-chlorophenyl) O-ethyl phosphorochloridothioate.

O-(4-chloro-2-cyclohexylphenyl) O-methyl 2-phenyl phosphorohydrazidothioate by the reaction of phenyl hydrazine and O-(4-chloro-2-cyclohexyl) O-methyl phosphorochloridothioate.

O-(2-chlorophenyl) O-ethyl phosphorohydrazidothioate by the reaction of hydrazine hydrate and O-(2-chlorophenyl) O-ethyl phosphorochloridothioate.

The new O-aryl O-lower alkyl phosphorohydrazidothioates are effective as herbicides, fungicides and parasiticides and are adapted to be employed for the control of undesirable vegetation, fungi such as *Alternaria solani* and numerous household and agricultural pests. For such use the product may be dispersed on a finely divided carrier and employed as dusts. The new product may also be employed in oils, as constituents in water emulsions or in water dispersions. In a representative operation 100 percent controls of two spotted spider mites and Mexican bean beetles have been obtained with aqueous compositions containing two pounds of O-(2,5-dimethylphenyl) O-methyl phosphorohydrazidothioate per 100 gallons of water.

The O-aryl O-lower alkyl phosphorochloridothioates employed as starting materials may be prepared by reacting from two to three molecular proportions of a lower alkanol with one molecular proportion of an O-aryl phosphorodichloridothioate at a temperature at which hydrogen chloride is formed as a product of reaction while continuously withdrawing hydrogen chloride in the gaseous state from the reaction mixture as formed, said temperature being at least 15 centigrade degrees below the boiling point at 760 millimeters pressure of the employed alkanol. In carrying out the reaction, the alkanol may be added portionwise to the O-aryl phosphorodichloridothioate reagent at a temperature of 40° to 50° C. and under conditions of reduced pressure in the reaction mixture. Following the reaction, the reaction mixture is partially distilled under reduced pressure to remove low boiling constituents and to obtain the desired product as a liquid residue. This method is disclosed and claimed in application Serial No. 581,267 filed concurrently herewith by Henry Tolkmith, Etcyl H. Blair and Kenneth C. Kauer.

I claim:
1. A phosphorohydrazidothioate having the formula

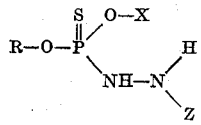

in which R represents an aryl radical of the benzene series whose monovalent phenyl nucleus may contain at least one substituent selected from the group consisting of chlorine, bromine, nitro and lower alkoxy, X represents a member of the group consisting of methyl and ethyl and Z represents a member of the group consisting of hydrogen and phenyl.

2. O-(2,4,5 - trichlorophenyl) O - methyl phosphorohydrazidothioate.

3. O - (dimethylphenyl) O - methyl phosphorohydrazidothioate.

4. O - (4 - nitrophenyl) O - methyl phosphorohydrazidothioate.

5. O - (2 - bromo - 4 - tertiarybutylphenyl) O - methyl phosphorohydrazidothioate.

6. O - (4 - methoxyphenyl) O - methyl phosphorohydrazidothioate.

References Cited in the file of this patent
UNITED STATES PATENTS
2,552,541    Drake et al. _____ May 15, 1951

OTHER REFERENCES

Autenrieth et al.: "Chemical Abstracts," vol. 19, (1925) page 2325.

"The Van Nostrand Chemist's Dictionary," Van Nostrand Co., Inc., New York, N. Y. Second printing (October 1953), pp. 41, 42 and 44.

"The Condensed Chemical Dictionary," Reinhold Publishing Corp., New York, N. Y. Fifth edition (1956), page 114.

UNITED STATES PATENT OFFICE
CERTIFICATE OF CORRECTION

Patent No. 2,855,423   Etcyl H. Blair   October 7, 1958

It is hereby certified that error appears in the printed specification of the above numbered patent requiring correction and that the said Letters Patent should read as corrected below.

Column 6, line 19, for "-(dimethylphenyl)" read -- -(2,5-dimethylphenyl) --

Signed and sealed this 17th day of March 1959.

(SEAL)
Attest:

KARL H. AXLINE           ROBERT C. WATSON
Attesting Officer          Commissioner of Patents